US007953858B2

(12) United States Patent
Xu et al.

(10) Patent No.: US 7,953,858 B2
(45) Date of Patent: May 31, 2011

(54) METHOD AND APPARATUS FOR MAPPING PEERS TO AN OVERLAY NETWORK

(75) Inventors: Zhichen Xu, Sunnyvale, CA (US); Zheng Zhang, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2805 days.

(21) Appl. No.: 10/346,067

(22) Filed: Jan. 17, 2003

(65) Prior Publication Data

US 2004/0143666 A1     Jul. 22, 2004

(51) Int. Cl.
*G06F 15/16*     (2006.01)

(52) U.S. Cl. .................................................. 709/227

(58) Field of Classification Search .............. 709/227, 709/217, 218, 230, 232, 238, 243
See application file for complete search history.

(56) References Cited

U.S. PATENT DOCUMENTS

| | | | | |
|---|---|---|---|---|
| 5,241,682 A * | 8/1993 | Bryant et al. | ................. | 709/249 |
| 6,304,556 B1 * | 10/2001 | Haas | ............................ | 370/254 |
| 6,611,872 B1 * | 8/2003 | McCanne | ..................... | 709/238 |
| 6,718,394 B2 * | 4/2004 | Cain | ............................. | 709/242 |
| 6,980,524 B1 * | 12/2005 | Lu et al. | ........................ | 370/254 |
| 7,020,464 B2 * | 3/2006 | Bahl et al. | .................. | 455/432.1 |

OTHER PUBLICATIONS

Tseng. et al. "Location awareness in ad hoc wireless mobile network", Jun. 2001, IEEE, Computer vol. 34, Issue 6, pp. 46-52.*
Martha E. SteenStrup "Routing in Communications networks", 1995, Prentice-Hall In.c, Chapter 11, p. 375-379.*
Pearlman, et al. "Determining the optimal configuration for the zone routing protocol" Aug. 1999, IEEE, IEEE journal on selected area in communications, vol. 17, issue 8, p. 1395-1414.*
Takahasi, et al., "Multilevel zone-based Hierarchical Link State Routing with location search technique applying hierarchical request for mobile and ad hoc networks", 2004, Wiley Periodicals Inc. Electronic and communications in Japan, Par 1, vol. 88, No. 1, pp. 44-52.*
Microsoft Computer Dictionary, fifth edition, p. 52, time-to-live defination.*
Microsoft computer dictionary 5th edition.*

\* cited by examiner

*Primary Examiner* — William C Vaughn, Jr.
*Assistant Examiner* — Scott Christensen

(57) ABSTRACT

In a method of mapping peers in a peer-to-peer network to an overlay network, network coordinates are determined for a selected peer. The logical coordinates in the overlay network are determined based on the network coordinates. A zone is determined based on the logical coordinates. The network coordinates, a network address of the selected peer and the zone is stored as an object at a peer owning the zone, where associated information is stored in the peer that has the network coordinate and using the network coordinate as a key.

25 Claims, 12 Drawing Sheets

METHOD AND APPARATUS FOR MAPPING PEERS TO AN OVERLAY NETWORK

CROSS-REFERENCE

The present invention is related to pending:

U.S. application Ser. No. 10/231,184, filed on Aug. 30, 2002, and entitled "EXPRESSWAY ROUTING AMONG PEERS", by Xu et al.;

U.S. application Ser. No. 10/237,618, filed on Sep. 10, 2002, and entitled "CREATING EXPRESSWAY FOR OVERLAY ROUTING" by Zhang et al.; and U.S. application Ser. No. 10/299,908, filed on Nov. 20, 2002, and entitled "METHOD AND APPARATUS FOR GENERATING A ROUTING TABLE" by Zhang et al.

Each of the cross referenced application is hereby incorporated by reference in its entirety as set forth into this Specification as set forth herein.

FIELD

This invention relates generally to network systems. More particularly, the invention relates to generating routing tables.

DESCRIPTION OF THE RELATED ART

Peer-to peer (P2P) systems represent a class of networks that utilize distributed resources and perform critical functions in a decentralized manner. Compared with traditional client/server systems, P2P systems have advantages such as improved scalability and reliability, elimination of hot spots surrounding big servers, better resource utilization, lower cost of ownership, etc.

Although P2P may indicate a shift in general purpose computing, the early generation of P2P systems were typically limited to information placement and look-up. One drawback and disadvantage of the earlier P2P systems is they could not guarantee information location for requesting applications. For instance, early P2P systems (e.g., Gnutella and Freenet) searched for a requested object, i.e., requested information, by looking for cached copies via flooding (they typically use heuristics to reduce the number of nodes that have to be flooded). As the result, the search may fail because the cached copies may not exist even when the requested object exists.

Accordingly, later generations of P2P systems dictated a consistent mapping between an object key to a hosting node. In these systems, an object can always be retrieved as long as the hosting nodes can be reached. The random generation of node identifications and documents keys allow even distribution of the data objects among the hosting nodes. Nodes in these later generation P2P systems comprise an overlay network. Since there is a consistent binding between objects to nodes, locating an object is reduced to the problem of routing to the destination node from the requesting node of where the query is submitted.

However, these later generation P2P systems also have disadvantages and drawbacks. As an example, the overlay network of the later generation P2P systems had limited capability to take advantage of the heterogeneity (e.g., storage capacity, packet forward capacity, network capacity, etc.) of their underlying network. More particularly, the overlay network of the later generation P2P systems were typically homogeneously constructed over the underlying network. Typically, the overlay network was constructed with network proximity as a guide. As a result, the physical topology of the overlay network may cause uneven node distribution and lead to hotspots (e.g., topology aware Content Addressable Network (CAN) from Berkeley).

Moreover, the later generation P2P systems may not be able to guarantee uniform document distribution. More particularly, for CAN systems, it is fairly certain that documents are evenly distributed across all nodes because nodes join randomly. However, attempts to distribute the nodes according to their physical location run a risk of uneven storage distribution since the partitions of space will reflect the network topology and are unlikely to be uniform. A possible solution may to use the physical distribution of nodes to affect or skew the distribution of documents. However, in a dynamic environment where nodes enter and leave randomly, coupling document distribution with node distribution may create unreasonable dependencies.

SUMMARY

One embodiment pertains to a method of mapping peers in a peer-to-peer network to an overlay network. The method includes determining network coordinates for a selected peer and determining logical coordinates in the overlay network based on the network coordinates. The method also includes determining a zone based on the logical coordinates and storing an object comprising the network coordinates, a network address of the selected peer, and the zone in a peer owning the zone where associated information is stored in the peer that has the network coordinates and using the network coordinates as a key.

Another embodiment relates to an apparatus for mapping peers in a peer-to-peer network to an overlay network. The apparatus includes means for determining a network coordinate of a peer and means for hashing the network coordinate to a target coordinate in the logical space of the overlay network. The apparatus also includes means for determining a target zone based on the target coordinate.

Yet another embodiment relates to a computer readable storage medium on which is embedded one or more computer programs. The one or more computer programs implement a method of mapping peers in a peer-to-peer network to an overlay network. The one or more computer programs include a set of instructions for determining a network coordinate of a peer and hashing the network coordinate to a target coordinate in the logical space of the overlay network. The set of instructions also include determining a target zone based on the target coordinate.

Yet another embodiment pertains to a system for mapping peers in a peer-to-peer network to an overlay network. The system includes a network and a plurality of peers interconnected by the network and configured to implement the overlay network. Each peer is configured to store coordinate maps based on a hashing of a network position of a selected peer to a logical space of the overlay network.

BRIEF DESCRIPTION OF THE DRAWINGS

Various features of the embodiments can be more fully appreciated as the same become better understood with reference to the following detailed description of the embodiments when considered in connection with the accompanying figures, in which.

DETAILED DESCRIPTION OF EMBODIMENTS

Figure 1:
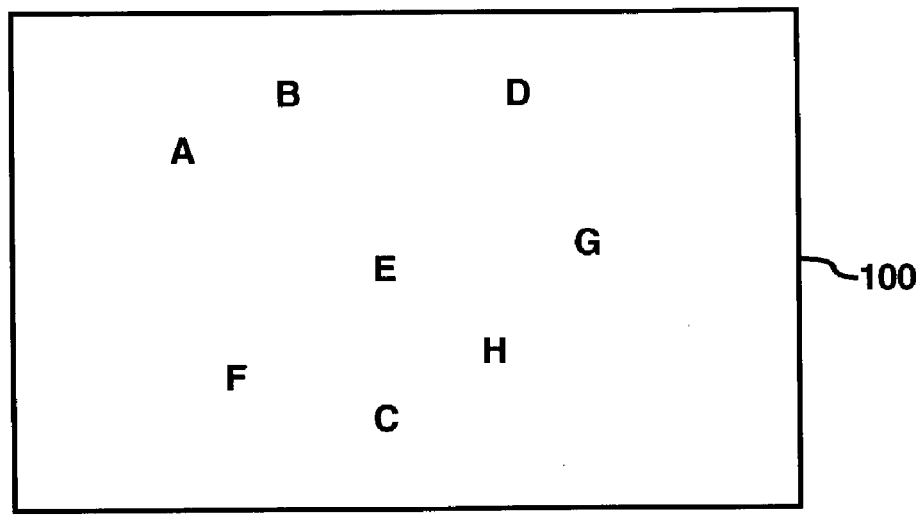
FIG. 1 illustrates an embodiment.
Figure 1:
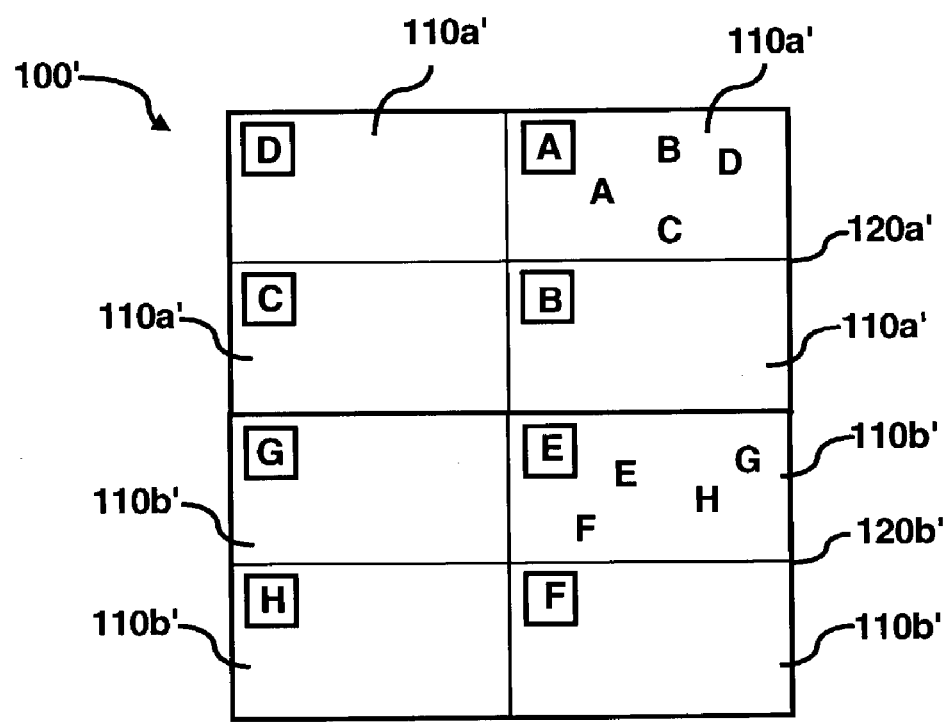

For simplicity and illustrative purposes, the principles of the present invention are described by referring mainly to exemplary embodiments thereof. However, one of ordinary skill in the art would readily recognize that the same principles are equally applicable to, and can be implemented in, all types of network systems, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Certain embodiments relate to tuning an expressway overlay network to the underlying peer-to-peer (P2P) network. More particularly, an embodiment relates to an expressway overlay network created over the existing P2P network. The expressway overlay network provides a mechanism for a peer to find the most direct route, i.e., an expressway, to a destination in the smallest number of Internet hops. Each peer in the underlying P2P network includes an expressway routing module, which collectively implement the expressway overlay network. Further detail and discussion of the expressway overlay network may be found in U.S. application Ser. No. 10/231,184, filed on Aug. 30, 2002, and entitled "EXPRESSWAY ROUTING AMONG PEERS" by Xu et al., which is assigned to the present assignee, and the disclosure of which is hereby incorporated by reference in its entirety.

The expressway overlay network may be decomposed into a hierarchal layer of zones. On one end of the hierarchy, the layer comprises of a single zone that is the entire space of the underlying P2P network. On the other end, the end layer comprises of the basic zones (or units) surrounding the peers of the underlying P2P network, where the number of zones is equivalent to the number of peers (or nodes) in the P2P network. In the intermediate layers of the hierarchy, each layer comprises of zones of a distinct size. For a selected zone in a particular layer, the selected zone may encompass smaller zones of the intermediate layers below the particular layer as well as the basic unit of a peer. Each zone may have one or more residents which act as a representative for the zone. However, for each peer of the P2P network, each peer is the owner of its respective zone.

The expressway routing module may utilize a routing table that captures the hierarchal nature of the expressway overlay network. The routing table of a selected peer may comprise a number of entries related to the number of layers in the expressway overlay network. Each entry in the routing table is associated with the zone of the selected peer in a given layer, neighboring zones for the zone, and one or more residents in each of the neighboring zones. The routing table entry that reflects the current state of the zone surrounding a peer, i.e., top of the hierarchy, may be referred to as a current table entry. Further detail and discussion of the expressway overlay network may be found in U.S. application Ser. No. 10/299,908, filed on Nov. 20, 2002, and entitled "METHOD AND APPARATUS FOR GENERATING A ROUTING TABLE" by Zhang et al., which is assigned to the present assignee, and the disclosure of which is hereby incorporated by reference in its entirety.

In yet another embodiment, the expressway routing module utilizes the routing table to expressway route between peers. More specifically, a peer may search the routing table for the largest zone that does not encompass the destination peer in response to a request to forward data, i.e., the largest neighboring zone that encompasses the destination peer. A communication channel may then be formed, i.e., an expressway, between the peer and a zone representative of the largest neighboring zone. If a neighboring zone is not found, the expressway routing module routes to an intermediate peer and the process to find the largest zone that does not encompass the destination repeats. Further detail and description of the expressway routing may be found in U.S. application Ser. No. 10/237,618, filed on Sep. 10, 2002, and entitled "CREATING EXPRESSWAY FOR OVERLAY ROUTING" by Xu et al., which are assigned to the assignee and are incorporated by reference herein in their entirety.

The selected neighboring zone may have more than one resident to expressway route thereto. Accordingly, in yet another embodiment, the expressway routing module may be configured to optimize routing performance by locating the one or more residents in the neighboring zone closest to the current peer. More specifically, the expressway routing module may determine a position of the peer executing the expressway routing module in coordinate space. The assumption is that the coordinate space position may approximate a node's position in the physical network. One example of determining the coordinate space position (or network coordinate) may be to measure a selected node against a set of landmark nodes, $I_n$. Thus, the network coordinate may be a vector of n-dimension. The number of landmarks in the set of landmark nodes may be user-specified, determined empirically or a combination thereof. The network coordinate may be measured using Euclidean distance, round-trip time, or any other similar metric.

In yet another embodiment, the expressway routing module may be configured to map a node's network coordinate into the logical space of the expressway overlay network. For example, if the expressway overlay network is a Cartesian based, the expressway routing module may be configured to map the network coordinate of a selected node into Cartesian space. The Cartesian coordinate of the selected node falls within a zone. The owner of the zone may not coincide with selected node because of the ordering of the expressway overlay network. The expressway routing module may then store a data tuple of the selected node comprising of the zone, network coordinate, and the address of the selected node in the node that owns the zone, i.e., a data triple. In this manner, a selected node may publish its position to form coordinate maps.

In yet another embodiment, the expressway routing module may be configured to construct coordinate maps based on network coordinates. More particularly, the expressway routing module may construct a coordinate map to for each higher order zone. For each node, the coordinate map includes a data triple comprising of zone of the node ($R_zZ$), network coordinate of the node (p), and the address of the node (ID), i.e., <$R_zZ$, p, ID>. With the coordinate maps, when a source peer selects a neighboring zone, the source peer may use its own network coordinate as a key to compute a position in the neighboring zone and route to the computed position. Once the destination is reached, the source peer may have a high probability to locate information about a node in the neighboring zone that is physically close to the source peer. As discussed above, the network coordinate of nodes reflects its physical position in the network. Thus, the information of the nodes are stored in such manner that if two network coordinates are close to each other than they will be stored close to each other in the destination zone.

FIG. 1 illustrates an embodiment on a peer-to-peer network. As shown in FIG. 1, network 100 includes nodes A-H. The nodes A-H are physically distributed in the network 100 as shown. The nodes A-H may each execute a peer-to-peer application that provides a peer-to-peer application. The nodes A-H may also execute an application (e.g., the expressway routing module) that implements an expressway overlay network. Accordingly, network 100' may represent expressway overlay network in accordance with an embodiment.

As shown in FIG. 1, the network 100' includes the fundamental zones of the expressway overlay network with zones 110a-b'. The higher order zones 120' represent groups of the zones 110'. For example, nodes A-D may each be represented respectively in zones 110a' as well as being part of the higher order 120a'. Similarly, nodes E-H may be represented respectively in zones 110b' as well as high order zone 120b'.

In accordance with an embodiment, nodes A-D determine their network coordinates and determine their respective triples. The nodes A-D then publish (or forward) their triples to the higher order zone, zone 120a'. Similarly with nodes E-H, the triples of nodes E-H are forwarded to zone 120b. Accordingly, when node A selects its expressway neighbor zone, zone E, node A retrieves the triples associated with zone E. Node A may then use the network coordinates from the retrieved triples and its own network coordinate to determine the closest node.

However, it is not guaranteed that a targeted zone will return any triples. To increase the probability that a node can locate candidates that are physically close, a number of techniques may be applied. For example, a node's network coordinates may be published not only in the selected zone, but also in a set of neighboring zones defined by a radius. An advantage of this technique is that this improves the availability of the may and also allows a summary of neighboring nodes to be built. Another technique may be to store the triples in a sub-space of a host zone. For example, if node A is selected to be host zone for zone 120a', then node A stores the data triples for zone 120a' and yielding a condense rate of 0.25. Similarly, with the same condense rate of 0.25, node E stores the data triples for zone 120b'.

Figure 2:
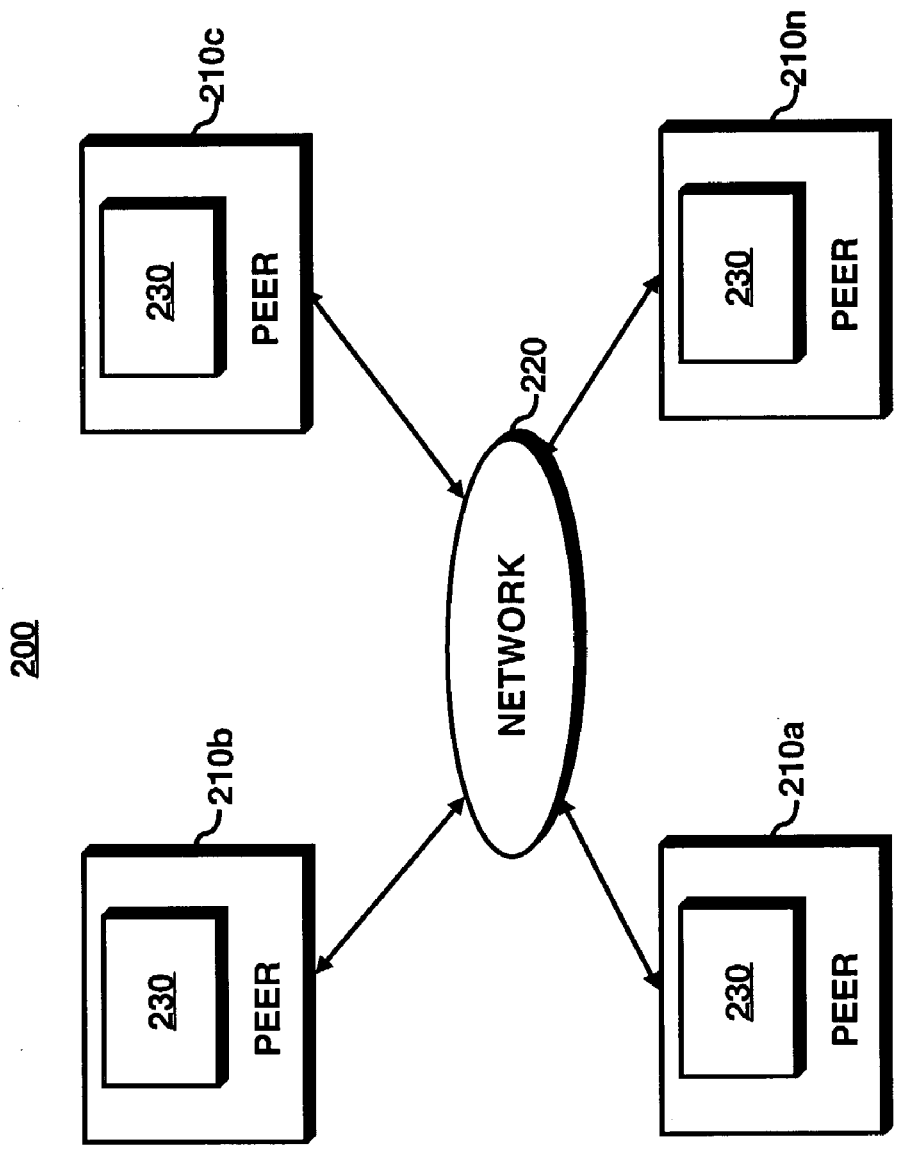
FIG. 2 illustrates an exemplary system where an embodiment may be practiced.

FIG. 2 illustrates an exemplary block diagram of a system 200 where an embodiment may be practiced. It should be readily apparent to those of ordinary skill in the art that the system 200 depicted in FIG. 2 represents a generalized schematic illustration and that other components may be added or existing components may be removed or modified.

As shown in FIG. 2, the system 200 includes a plurality of peers 210a . . . n. The peers 210a . . . n may be configured to exchange information among themselves and with other network nodes over a network 220. The peers 210a . . . n may be computing platforms (e.g., personal digital assistants, laptop computers, workstations, and other similar devices) that have a network interface. The peers 210a . . . n may be further configured to execute an application software program that provides the capability to share information (e.g., files, data, applications, etc.) in a peer-to-peer manner. An example of a peer-to-peer software application is KAZAA, NAPSTER, MORPHEUS, or other similar P2P applications.

The network 210 may be configured to provide a mechanism to exchange electronic signals among the peers 210a . . . n. The network 220 may be implemented as a local area network, wide area network or combination thereof. The network 220 may implement wired protocols such as Ethernet, token ring, etc., wireless protocols such as Cellular Digital Packet Data, Mobitex, IEEE 802.11b, Wireless Application Protocol, Global System for Mobiles, etc., or combination thereof.

According to an embodiment, each peer of the peers 210a . . . n may comprise an expressway routing module 230. The expressway routing module 230 may implement an expressway overlay network for routing data over the existing P2P network, e.g., content addressable network (CAN), CHORD, etc. The expressway overlay network may be configured to divide the entire logical space of the existing P2P system into zones. For example, if the logical space of the existing P2P system is Cartesian space, the logical space is divided into zones, which is illustrated in FIG. 2.

Figure 3:
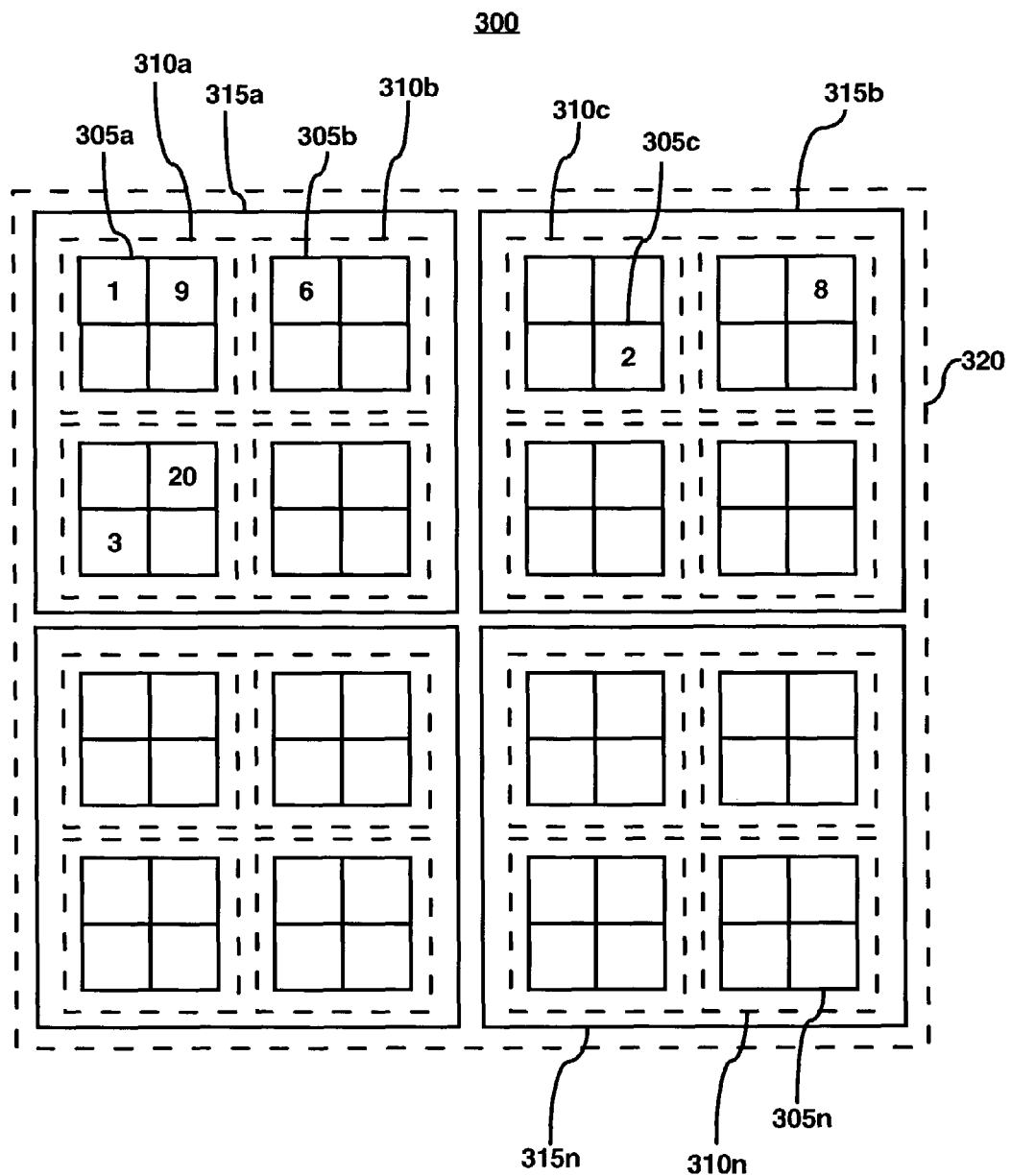
FIG. 3 illustrates an expressway overlay network according to an embodiment.

FIG. 3 illustrates an expressway overlay network 300 according to an embodiment. It should be readily apparent to those of ordinary skill in the art that the expressway overlay network 300 depicted in FIG. 3 represents a generalized abstraction and that other versions or configurations may be implemented.

As shown in FIG. 3, base zones 305a . . . n may be the core unit of the underlying P2P network zone. For example, if the existing P2P network is a CAN network, the base zone is a CAN zone. In each base zone 305a . . . n, a zone representative may be appointed. The zone representative may be considered the owner of the zone and becomes the routing point for data routed to the therein. For example, in zone 305a, peer 1 is the zone representative.

In another embodiment, the underlying network may be a Tapestry network. The prefix of the node identification (ID) may be considered a zone that encompasses the respective peer. The smaller the number of bits in the node ID, the larger the zone. Similarly, in yet another embodiment, the underlying network may be a Pastry network. The suffix of the node ID may be considered a zone that encompasses the peer. The smaller the number of bits in the node ID, the larger the zone. The difference between a CAN zone and a Tapestry zone is that the Tapestry zone is no longer Cartesian space. Rather, it is a set of possible node IDs. Note, in a CAN network, the node IDs are pointers and a Cartesian space is a set of pointers.

As part of the expressway overlay network 300, larger zones may be formed from smaller zones. For example, intermediate zones 310a . . . n may be formed from the base zones 305a . . . n. Intermediate zones 315a . . . n may be formed from intermediate zones 310a . . . n. The largest zone 320, the entire space of the P2P network, is formed from intermediate zones 315a . . . n.

As with the base zone 305a . . . n, the intermediates zones 30a . . . n, 315a . . . n, may elect (or appoint, select, etc.) one or more zone representatives for each zone. For example, peers 3 and 6, individually and in combination, may become a representative for zone 315a. For example, peer 1 is the zone representative of base zone 305a as well as members of intermediate zones 310a and 315a. As another example, peer 6 may be zone representative for base zone 305*b* as well as members of intermediate zones 310*b* and 315*a*. Similarly, peer 2 can represent zone 305*c* and 315*b*.

In accordance with an embodiment, each zone, from base zone to largest zone, may be associated with a routing level, L, i.e., the number of expressways known to a peer. The highest value of the routing level, L, may indicate the depth of the expressway overlay network 300. For example, expressway overlay network 300 (see FIG. 3) may have L=3 which is associated with the base zone 305*a* . . . *n*; L=2 associated with intermediate zones 310*a* . . . *n*; L=2 associated with intermediate zones 315*a* . . . *n*; and L=0 for the largest zone 320. Thus, indicating a depth of four (4) and the number of expressways known to the peer.

Returning to FIG. 3, the expressway routing module 230 may also be configured to form expressways between a source peer and a destination to route date according to another embodiment. For example, if peer 1 is to forward data to peer 2, peer 1 may determine that the largest zone that does not encompass the peer 2 is intermediate zone 315*a*. Subsequently, peer 2 forms a communication channel, e.g., a TCP/IP connection to the zone representative (e.g., peer 2) of intermediate zone 315*b*. Accordingly, data is routed in a substantially efficient manner by bypassing as many intermediate peers as possible between peer 1 and peer 2.

In another embodiment, a source peer may route data by expressways to an intermediate peer. More particularly, a source peer may select the largest neighboring zone based on the closest distance of the neighboring zone to the destination peer. For example, if peer 1 is requested to forward data to peer 2 (shown in FIG. 3), peer 1 may determine that the largest zone that does not encompass peer 2 is 315*a*. Accordingly, peer 1 forms a communication channel to the zone representative, peer 2, of the largest neighboring zone 315*b*. Subsequently, peer 2 may search for the largest zone that does not encompass the destination to forward the data, i.e., zone 315*b*. Thus, each intermediate peer may search its routing table to find an expressway route to the destination peer.

Since a neighboring zone may have one or more residents, i.e., zone representatives, a new peer joining the expressway overlay network 300 may optimize performance by locating the one or more residents closest to the new peer. Accordingly, in yet another embodiment, a map is built for each high-order zone for the nodes that belong to the zone. In particular, for each high-order zone a peer is a member, the expressway routing module 230 may map the peer, e.g. peer 20, into the zone based on the network coordinate of the node. In one embodiment, the network coordinates may be obtained using GPS devices. In another embodiment, its network coordinate can be computed by measuring against a set of landmark nodes. In one embodiment, if peer 20 is a newly joined node, peer 20 may iterate through the routing table and determine Cartesian coordinates based on the network coordinates of peer 20 for each zone in the routing table. Peer 20 may then form a triple of the zone, network identification of the peer, and the network coordinates. Subsequently, the triple may then be stored in the peer that owns the zone where the network coordinates fall, i.e., the node that owns the Cartesian coordinates. The ownership of the zone where the Cartesian coordinates fall may change as the peers join and exit the expressway overlay network.

In another embodiment, for a node that is being split with a newly joined node, the expressway routing module may map network coordinates of a selected peer, e.g., peer 20 (shown in FIG. 3), to Cartesian coordinates as the expressway overlay network expands. More specifically, the expressway routing module 230 of peer 20 may test the zone extracted from the current table entry for peer 20 with a target zone. If the current zone of the peer 20 is smaller or equal to the target zone, the expressway routing module 230 may create a new current table entry for the routing table of the peer 20. The expressway routing module 230 may increment the level indicator and determine a new zone for the selected peer, neighboring zones and one or more residents in the neighboring zones for the new current table entry. The expressway routing module 230 may then map the position of peer 20 from network coordinates to Cartesian coordinates of the new zone being pushed to the total routing table. Subsequently, the expressway routing module may associate the current zone, a network identification of the selected peer and the network coordinate of peer 20 as a data triple. The data triple is then stored with the peer that owns the zone where the mapped Cartesian coordinates fall.

Figure 4:
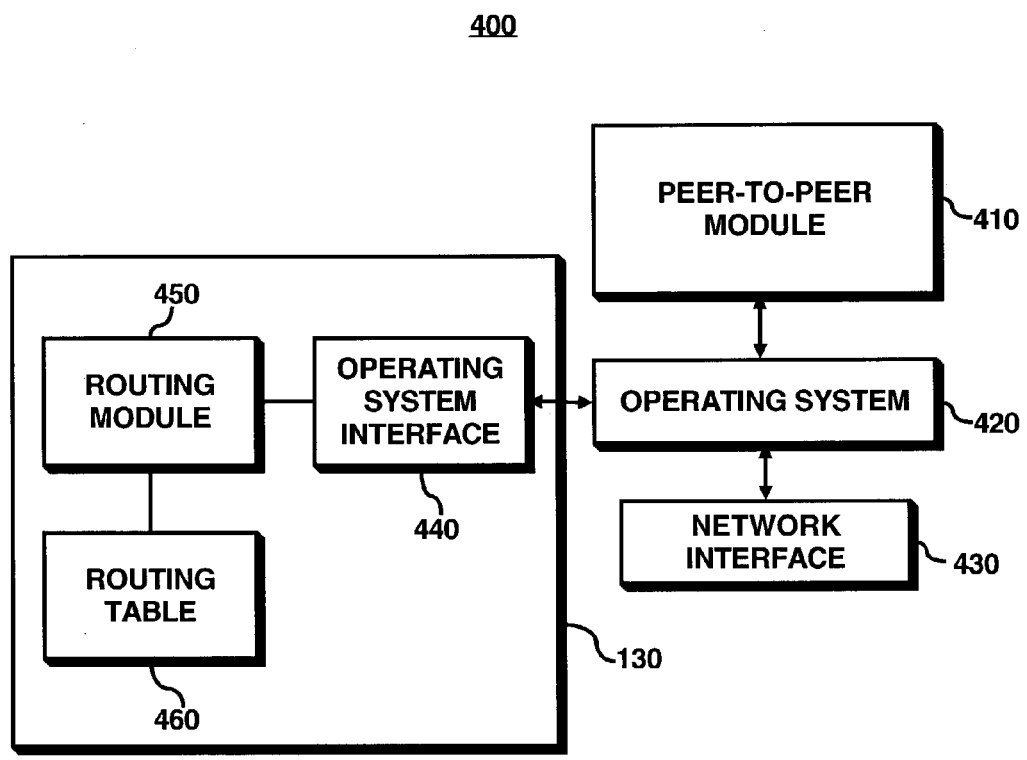
FIG. 4 illustrates an exemplary architecture for an expressway routing module shown in FIG. 2 according to another embodiment.

FIG. 4 illustrates an exemplary architecture 400 for the expressway routing module 230 shown in FIG. 2 in accordance with an embodiment. It should be readily apparent to those of ordinary skill in the art that the architecture 400 depicted in FIG. 4 represents a generalized schematic illustration and that other components may be added or existing components may be removed or modified. Moreover, the architecture 400 may be implemented using software components, hardware components, or a combination thereof.

As shown in FIG. 4, the architecture 400 may include a peer-to-peer module, an operating system 420, the expressway routing module 230, and a network interface. The peer-to-peer module 410 may be configured to provide the capability to a user of a peer to share information with another peer, i.e., each peer may initiate a communication session with another peer. The peer-to-peer module 410 may be a commercial off-the-shelf application program, a customized software application or other similar computer program. Such programs such as KAZAA, NAPSTER, MORPHEUS, or other similar P2P applications may implement the peer-to-peer module 410.

The expressway routing module 230 may be configured to monitor an interface between the peer-to-peer module 410 and the operating system 420 through an operating system interface 440. The operating system interface 440 may be implemented as an application program interface, a function call or other similar interfacing technique.

The expressway routing module 230 may include a routing module 450 and a routing table 460. The routing module 450 may be configured to implement the expressway overlay network and the expressway routing. More particularly, the routing module 450 may create the expressway overlay network described with respect to FIG. 3, by implementing routing tables as shown in FIG. 5.

Figure 5:
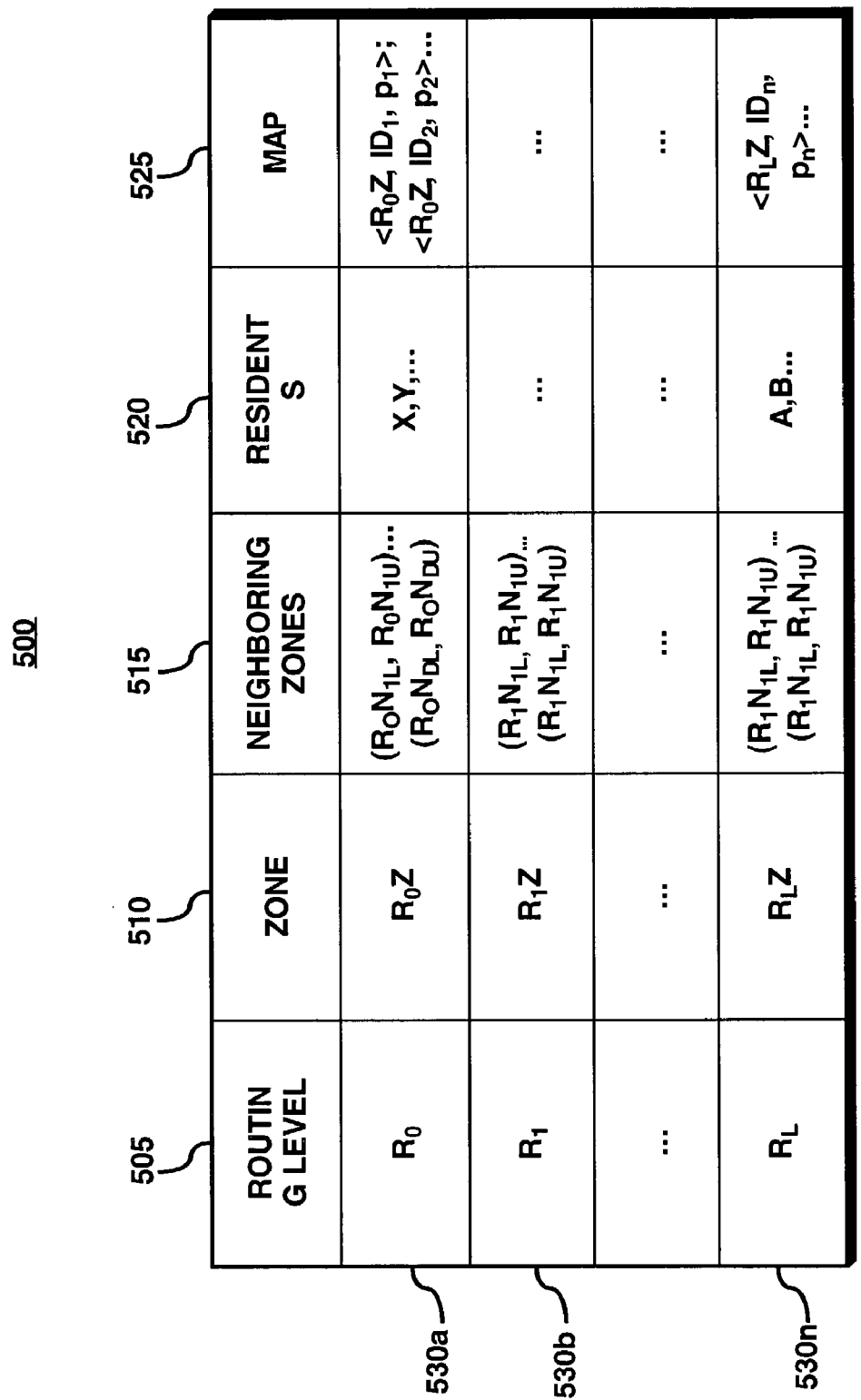
FIG. 5 illustrates a routing table shown in FIG. 3 in accordance with yet another embodiment.

FIG. 5 illustrates the routing table 460 as shown in FIG. 4 in accordance with an embodiment. It should be readily apparent to those of ordinary skill in the art that the routing table 460 depicted in FIG. 5 represents a generalized illustration and that other fields may be added or existing fields may be removed or modified.

As shown in FIG. 5, the routing table 460 may include a routing level field 505, a zone field 520, a neighboring zones field 525, a residents field 520 and a map field 525. In one embodiment, the values in the routing level field 505, the zone field 520, the neighboring zones 525, the residents field 520, and the map field 525 are associated or linked together in each entry of the entries 530*a* . . . 530*n*.

A value in the routing level field 505 may indicate the span the between zone representatives. The range of values for the level of the zone may range from the basic unit of the P2P system ($R_L$) to the entire space of the P2P system ($R_0$). The largest value in the routing level field 505 may indicate the depth of the routing table as well as being the current table entry.

A value in the zone field 520 may indicate which zones the associated peer is aware thereof. At the $R_0$ level for peer 2, the zone would be in the entire space of the existing P2P network. For example, with reference to FIG. 3, the entire space of the P2P system is a Cartesian space of two dimensions (x, y). The zone may be indicated by a designation of (0 . . . 2) in the x-direction and (0 . . . 2) in the y-direction. At the $R_L$ level for peer 2, the zone may be indicated by a designation of (0 . . . 0.225) in the x-direction and (0.8750 . . . 2).

Values in the neighboring zones field 525 indicate the identified neighbor zones to the peer. A neighbor zone may be determined by whether a zone shares a common border in the coordinate space; i.e., in a d-dimensional coordinate space, two nodes are neighbors if their coordinate spans overlap along d-2 dimensions and abut along one dimension. Continuing on with the above example, at the $R_0$ level for peer 2, the neighboring zones may be designated as lower neighbor zone: (0 . . . 2)(0 . . . 2) with zone representative as peer 2 and upper neighbor zone (0 . . . 2)(0 . . . 2) with zone representative as peer 2 in the x-direction. The neighboring zones in the y-direction may be designated as lower neighbor zone (0 . . . 2)(0 . . . 2) with zone representative as peer 2 and upper neighbor zone (0 . . . 2)(0 . . . 2) with zone representative as peer 2. Similarly, for peer 2's zone at level L, its lower neighbor along x-direction is the zone (0.8750 . . . 2) (0.8750 . . . 2) with peer 8 as the representative, whereas it upper neighbor is the zone (0.225 . . . 0.25)(0.875 . . . 2.0) with peer 9 as representative. It should be noted that only representative for neighbor zones at level L need to be kept as hard state (i.e., unmodified), the representatives for neighbor zones at a lower-level are soft states that can be modified on-the-fly to adapt to changing network conditions. In one embodiment, the representatives of a neighbor zone are selected based on closest distance (e.g., number of hops) to the current peer.

Values in the resident fields 520 may indicate the identities of residents for the neighboring zones stored in the neighboring zones field 525. The values in residents field 520 may be indexed to the values the neighboring zones field 525 to associate the appropriate resident in the proper neighboring zone.

Values in the map field 525 may indicate triples associating zones, network identifications, and network coordinates. In one embodiment, the triples may also include replications of entries that belong to a neighboring high-order zone to improve the availability of the map.

In another embodiment, the routing module 450 may be configured to implement the generation of routing tables for its respective peer, as described above and in greater detail below. More particularly, the routing module 450 may implement the evolving snapshot algorithm to generate or maintain a routing table of its respective peer.

Returning to FIG. 4, the routing module 450 may be implemented as a software program, a utility, a subroutine, or other similar programming entity. In this respect, the routing module 450 may be implemented using software languages such as C, C++, JAVA, etc. Alternatively, the routing module 450 may be implemented as an electronic device utilizing an application specific integrated circuit, discrete components, solid-state components or combination thereof.

The operating system 420 may be configured to manage the software applications, data and respective hardware components (e.g., displays, disk drives, etc.) of a peer. The operating system 420 may be implemented by the MICROSOFT WINDOWS family of operating systems, UNIX, HEWLETT-PACKARD HP-UX, LINUX, RIM OS, and other similar operating systems.

The operating system 420 may be further configured to couple with the network interface 430 through a device driver (not shown). The network interface 430 may be configured to provide a communication port for the respective peer over the network 220 (shown in FIG. 2). The network interface 430 may be implemented using a network interface card, a wireless interface card or other similar input/output device.

Figures 6, 6A:
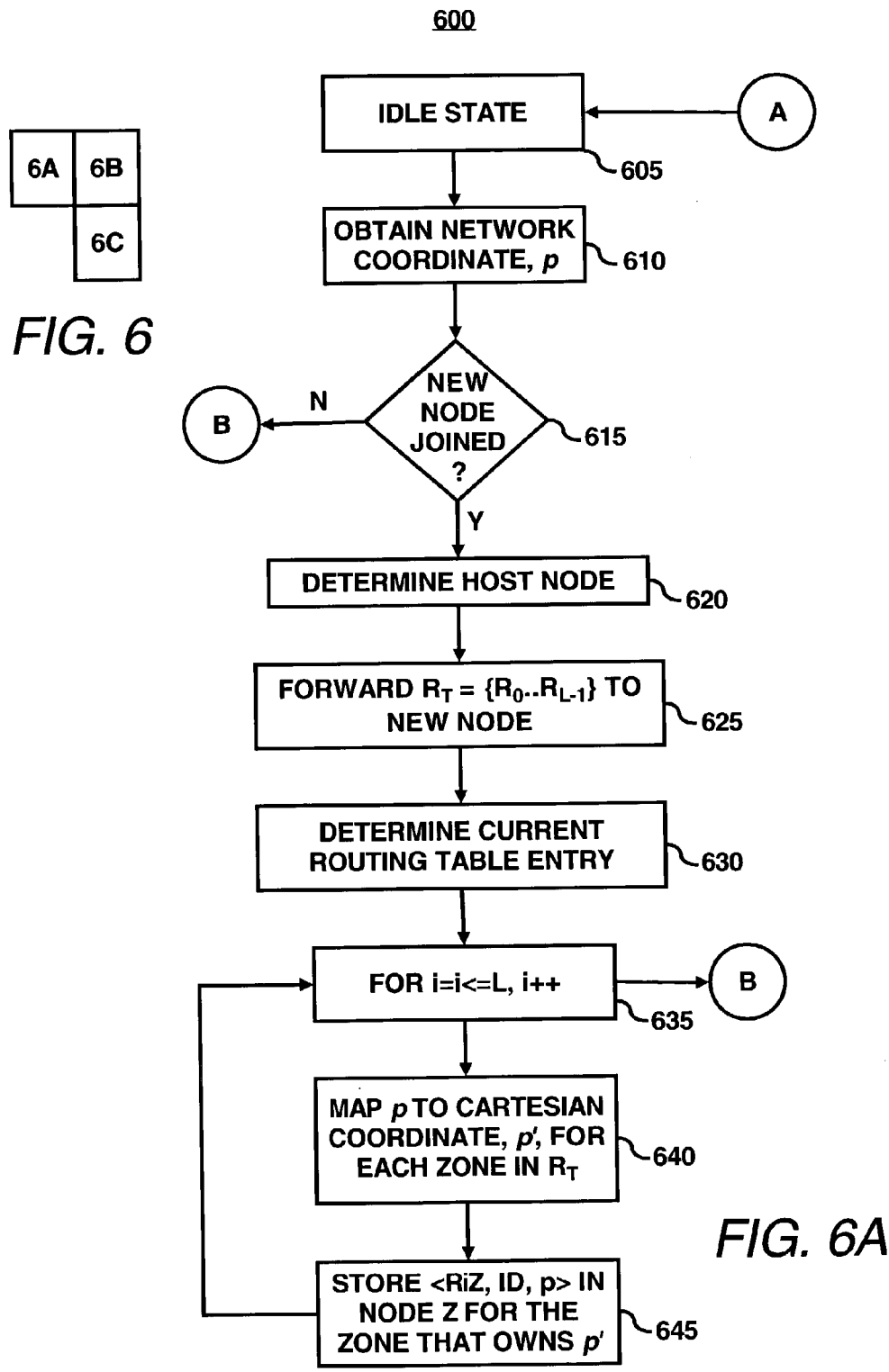
FIG. 6 is a key to FIGS. 6A-C.
FIGS. 6A-C collectively illustrate an exemplary flow diagram according to yet another embodiment.
Figure 6B:
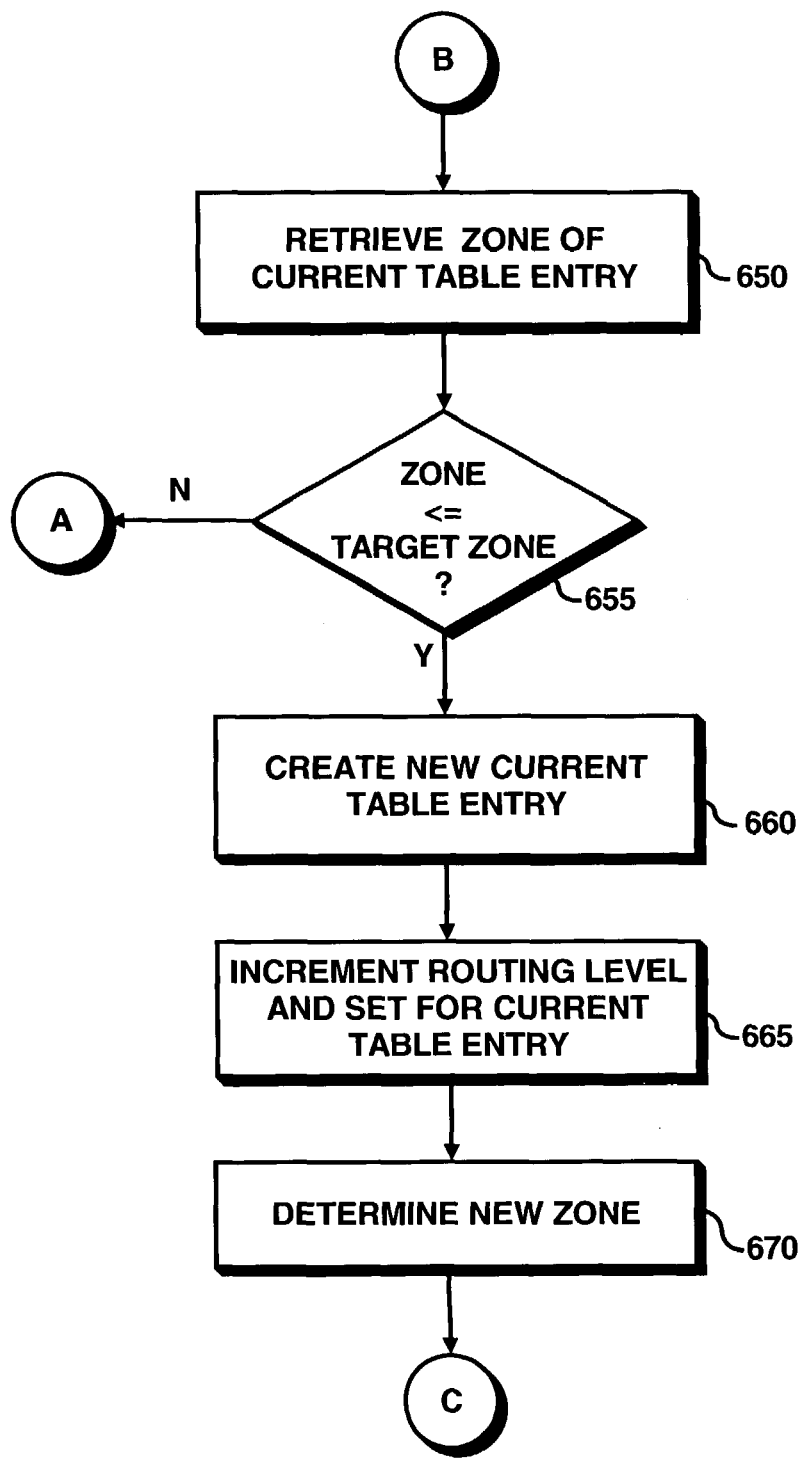
Figure 6C:
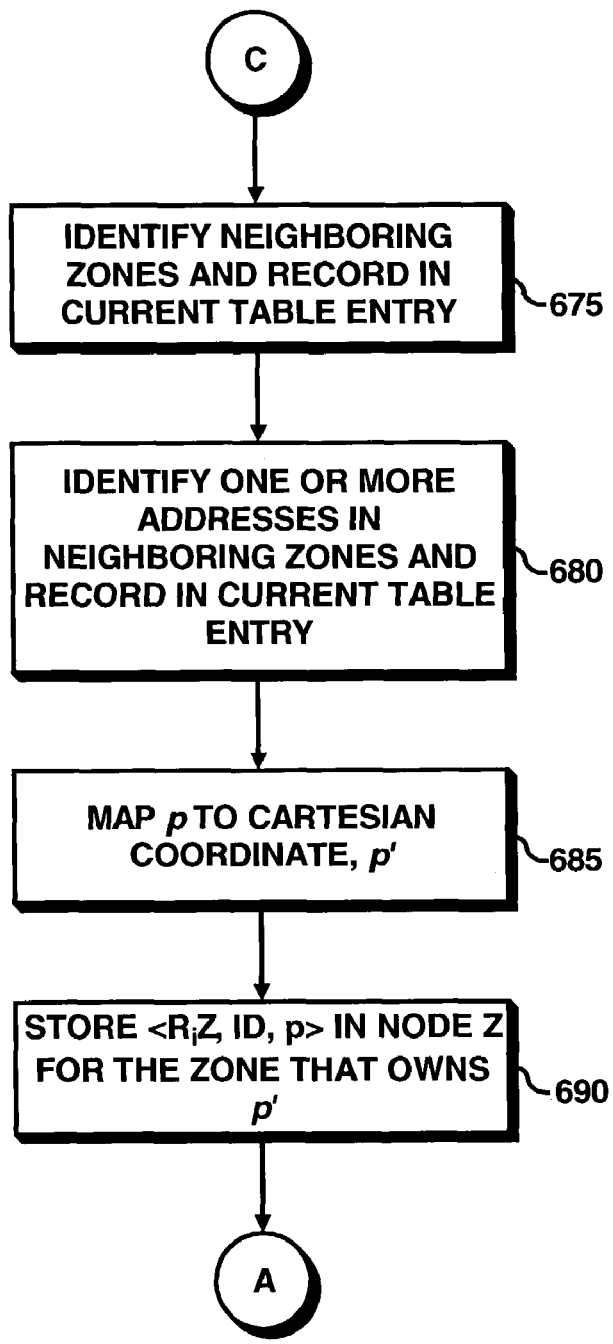

FIGS. 6A-C collectively illustrate an exemplary flow diagram 600 of mapping network coordinates to Cartesian coordinates in accordance with another embodiment. It should be readily apparent to those of ordinary skill in the art that this method 600 represents a generalized illustration and that other steps may be added or existing steps may be removed or modified.

Referring to FIG. 6A, the routing module 450 may be configured to be in an idle state, in step 605. The routing module 450 may be configured to obtain network coordinate, p, of its respective peer in response to a new peer attempting to join the expressway overlay network 100' (shown in FIG. 1). The network coordinates may be obtained by using physical location of the routing module 450 in the network, e.g., as global positioning system (GPS) satellites. It should be readily obvious that other forms of obtaining physical location of the routing module 450 may be used. Alternatively, the routing module 450 may generate a landmark vector, $l_n$, as the network coordinate. The routing module 450 may measure its distance to a set of landmark peers in the peer-to-peer network, e.g., network 200. The routing module 450 may use Euclidean distance or round-trip travel packets to determine a value to each landmark peer. The number of landmarks may be user-specified, empirically determined, or a combination thereof.

In step 615, the routing module 450 may be configured to determine whether the routing module 450 is the new node (or peer) joining the expressway overlay network 200. If the peer of the routing module 450 is the new node, the routing module 450 may be configured to determine the identity of a host node, in step 620. The new node will be joining the expressway overlay network 100 within an existing zone of the host node. Otherwise, if the peer of the routing module 450 determines that it is not a new node, the routing module 450 proceeds to the processing of step 650 (with reference to FIG. 6B), which is discussed in greater detail below.

In step 625, the routing module 450 may be configured to received the routing table of the host node except for the current table entry of the host node, i.e., $R_T = \{R_0 \ldots R_{L-1}\}$. In step 630, the routing module 450 may be configured to determine the current table entry. More particularly, the routing module 450 may determine the current zone, neighboring zones, and one or more residents within each neighboring zones.

In step 635, the routing module 450 may be configured to set a loop to process the entries in the routing table. Since the entries in the routing table are indexed by the routing level indicator, the index counter is set from zero (0) to L−1 and set to exit when the index counter reaches L−1.

In step 640, the routing module 450 may be configured to extract the zone, $R_iZ$, indexed by the index counter. The routing module 450 may then map the network coordinates, p, to Cartesian coordinates, p', for the extracted zone.

In step 645, the routing module 450 may be configured to associate the extracted zone, a network identification (e.g., IP address) for the peer, and the network coordinates of the peer as a data triple. The data triple may be a data structure linking the extracted zone, network identification and the network coordinates together. The routing module 450 may then store the data triple in the node that owns the zone where the Cartesian coordinates, p', fall. Subsequently, the routing module 450 may be configured to return to the processing of step 635.

Referring to FIG. 6B, in step 650, the routing module 450 may be configured to retrieve the zone from the current table entry of the routing table 460. In step 655, the routing module 450 may compare the retrieved zone with a target zone. In an embodiment, the target zone may be chosen as the zone from a previous routing table entry divided by the span of the expressway, e.g., $(R_{L-1}Z)K$. In other embodiments, the target zone may be user-specified or selected based on network parameters.

If the zone of the current table entry is not smaller or equal to the target zone, the routing module 450 may be configured return to the idle state of step 605 (shown in FIG. 6A). Otherwise, if the zone of the current table entry of the routing table 460 is smaller or equal to the target zone, the routing module 450 may be configured create a new current table entry, in step 660. In effect, the routing module 450 may determine the latest version of the current table entry.

In step 660, the routing module 450 may increment the routing level, L. The routing module 450 may also associated the new value of the routing level with the current table entry. In step 670, the routing module 450 may be configured to determine a new zone, $R_L Z$ for the incremented routing level. The determined zone may then be associated with the current routing table entry.

Referring to FIG. 6C, in step 675, the routing module 450 may identify neighboring zones and associated the neighboring zone with the current routing table entry. In step 680, the routing module 450 may be configured to identify one or more addresses in each of the neighboring zones as residents therein.

In step 685, the routing module 450 may be configured to determine the Cartesian coordinates from the network coordinates of the routing module 450 for the new zone. The routing module 450 may then associate the new zone, the network ID of the selected peer, and the network coordinates as a triple.

In step 690, the routing module 450 may forward the triple to the node that owns the zone where the Cartesian coordinates fall for storage as a distributed map. Subsequently, the routing module 450 may return to the idle state of step 605 (shown in FIG. 6A).

Figure 7:
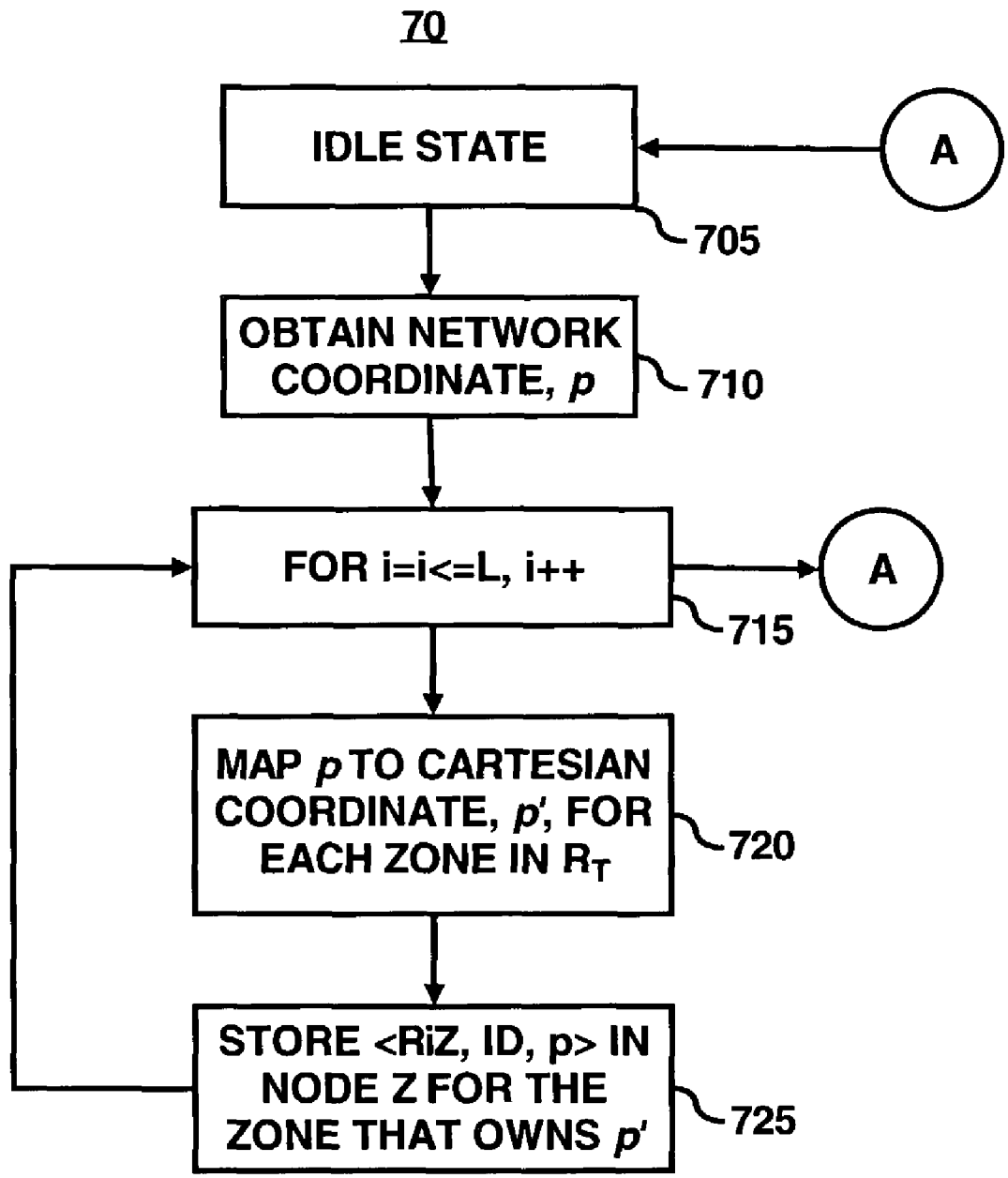
FIG. 7 illustrates an exemplary flow diagram according to yet another embodiment.

FIG. 7 illustrates an exemplary flow diagram 700 for the expressway routing module 230 and routing module 450 shown in FIGS. 2 and 4 with respect to determining the closest node in accordance with yet another embodiment. It should be readily apparent to those of ordinary skill in the art that this method 700 represents a generalized illustration and that other steps may be added or existing steps may be removed or modified.

As shown in FIG. 7, the routing module 450 may implement the steps of flow diagram 700 periodically during idle times of a node. In step 705, the routing module 450 may detect that a node is an idle state. Periodically or in response to an event, the routing module 450 may be configured to obtain network coordinate, p, of its respective peer, in step 710. The network coordinates may be obtained by using physical location of the routing module 450 in the network, e.g., as global positioning system (GPS) satellites. It should be readily obvious that other forms of obtaining physical location of the routing module 450 may be used. Alternatively, the routing module 450 may generate a landmark vector, $I_n$, as the network coordinate. The routing module 450 may measure its distance to a set of landmark peers in the peer-to-peer network, e.g., network 200. The routing module 450 may use Euclidean distance or round-trip travel packets to determine a value to each landmark peer. The number of landmarks may be user-specified, empirically determined, or a combination thereof.

An index counter may be initialized to examine the respective routing table associated with routing module 450 with a limit of the routing level, L, for the index counter. In step 715, the routing module 450 may be configured to extract the zone, $R_i Z$, indexed by the index counter. The routing module 450 may then map the network coordinates, p, to Cartesian coordinates, p', for the extracted zone, in step 720.

In step 725, the routing module 450 may be configured to associate the extracted zone, a network identification (e.g., IP address) for the peer, and the network coordinates of the peer as a data triple (or object). The data triple may be a data structure linking the extracted zone, network identification and the network coordinates together. The routing module 450 may then store the data triple in the node that owns the zone where the Cartesian coordinates, p', fall. Subsequently, the routing module 450 may be configured to return to the processing of step 715.

If the index counter has exceeded the routing level, L, the routing module 450 returns to the idle state of step 705. Otherwise, if the index counter has not exceeded the routing level, L, the routing module may return to the processing of steps 720 and 725 with a new extracted zone.

Figure 8A:
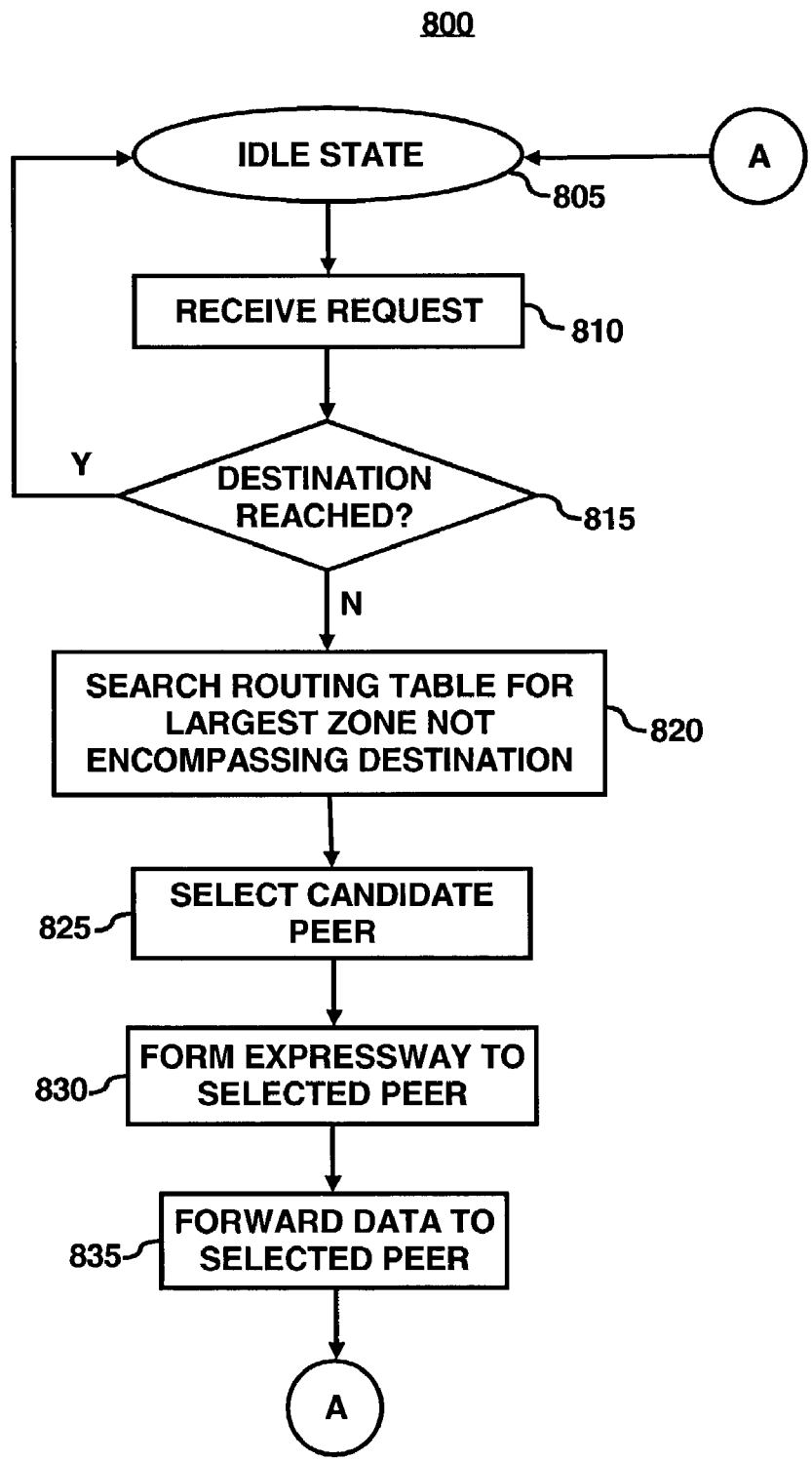
FIG. 8A illustrates an exemplary flow diagram according to yet another embodiment.

FIG. 8A illustrates an exemplary flow diagram 800 for the expressway routing module 230 and routing module 450 shown in FIGS. 2 and 4 with respect to determining the closest node in accordance with yet another embodiment. It should be readily apparent to those of ordinary skill in the art that this method 800 represents a generalized illustration and that other steps may be added or existing steps may be removed or modified.

As shown in FIG. 8A, the routing module 450 of a source peer may be configured to be in an idle state in step 805. The routing module 450 may monitor the network interface 430 via the operating system 420 (shown in FIG. 4) for any received requests to route data. A user of a peer may initiate the requests or the requests may be forwarded to the receiving peer functioning as an intermediate peer.

In step 810, the routing module 450 may detect a message (or request) received through the network interface 430. The routing module 450 may be configured to temporarily store the message for processing.

In step 815, the routing module 450 determines whether the message has reached its destination. More particularly, the routing module 450 may check the destination address of the message to determine whether the receiving peer is the destination for the message. If the destination is the receiving peer, the routing module 450 may return to the idle state of step 805.

Otherwise, in step 820, the routing module 450 may be configured to search the routing table 460 for a largest zone not encompassing the destination. It should be noted that the largest zone that does not encompass the destination can always be found, given the way the zones are determined as described above. Given this zone, an intermediate zone (a high-order neighbor of the largest zone that does not encompass the destination) is identified.

The routing module 450, in step 825, may determine the closest peer based on a coordinate map. The closest peer may have been determined by the processing associated with the flow diagram 800 discussed herein below and with respect to FIG. 8B. For example, the routing module 450 may calculate the Euclidean distance between the peer executing the routing module 450 to each of the nodes returned in the coordinate maps. The routing module 450 may select the node with the lowest value of Euclidean distance. In another embodiment, the routing module 450 may use the Euclidean distance to select a user-specified number of candidates and use the round-trip measurements to identify the actual closest peer among the candidates.

In step 830, the routing module 450 may form an expressway to the selected candidate peer based on the minimal value of the Euclidean distance or other similar metric. In step 835, the routing module 450 may forward the data to the selected peer. Subsequently, the routing module 450 may return to the idle state of step 805 (shown on FIG. 8A).

Figure 8B:
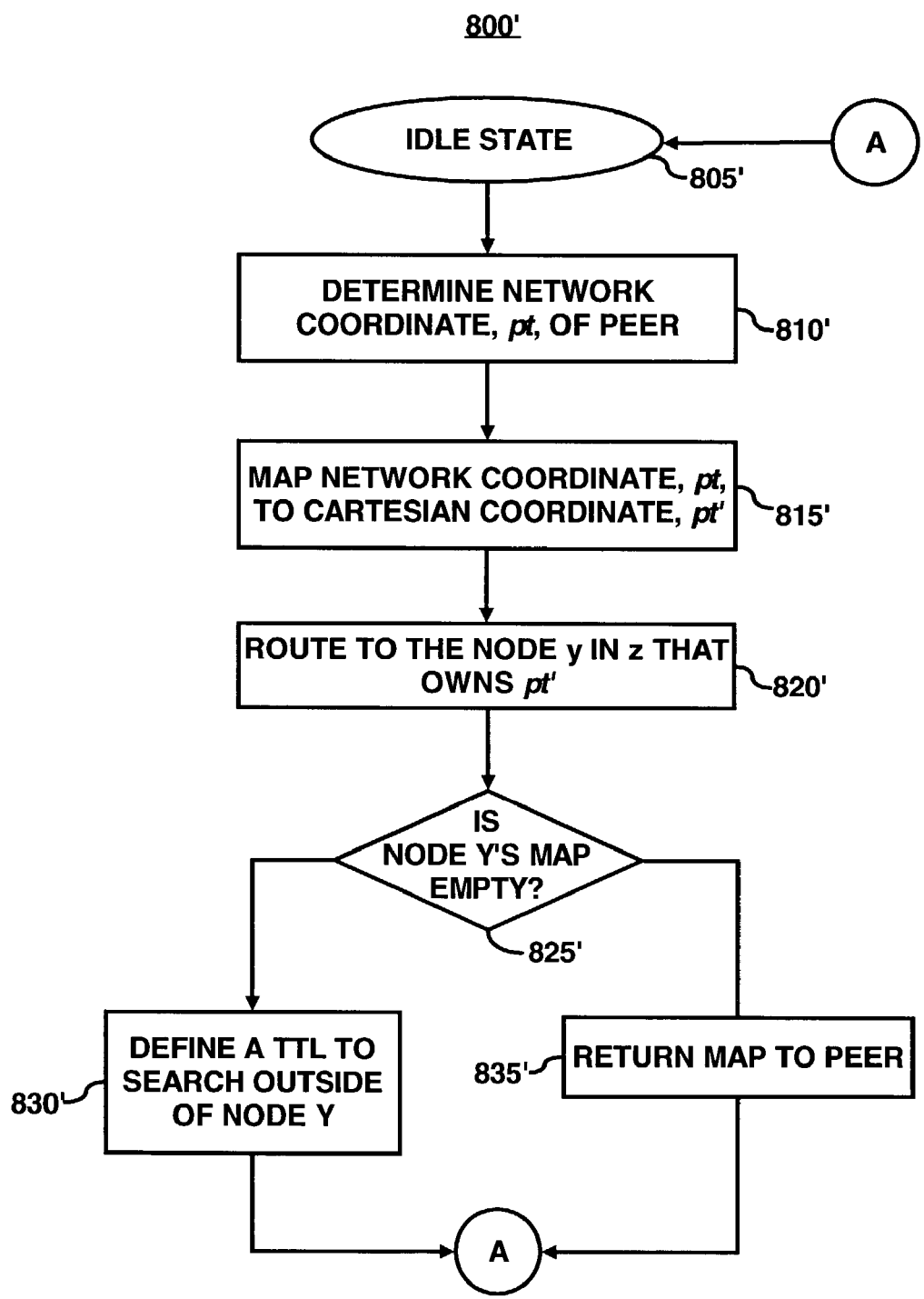
FIG. 8B illustrates an exemplary flow diagram according to yet another embodiment.

FIG. 8B illustrates an exemplary flow diagram 800' for the expressway routing module 230 and routing module 450 shown in FIGS. 2 and 4 with respect to determining the closest node in accordance with yet another embodiment. It should be readily apparent to those of ordinary skill in the art that this method 800' represents a generalized illustration and that other steps may be added or existing steps may be removed or modified.

The routing module 450 may generate the coordinate map during the idle times of a node. In that regard, in step 805', the routing module 450 may be in an idle state. Periodically during the idle times, the routing module 450 may be configured to determine the network coordinates, pt, of the selected peer, in step 810'. For example, the network coordinates may be determined by utilizing GPS system. Alternatively, the network coordinates may be a landmark vector determined by the routing module 450 as described previously.

In step 815', the routing module 450 may be configured to determine (or map) the network coordinates, pt, to a Cartesian coordinates, pt', of the underlying P2P system. The routing module 450 may use a hash function that maps the dimensionality of the landmark vector to the dimension of the expressway overlay network. For example, the hash function may be pt'=h(pt, dp, dz, z), where dp is the dimension of pt; z is the region in which pt's proximity information is about to be stored; dz is the dimension of region z; and pt' is a position in region z.

In step 820', the routing module 450 may be configured to locate the node that owns the zone where the mapped Cartesian coordinates, pt', fall and route to the located node. In step 825', the routing module 450 may be query the located node to determine whether any existing maps are stored on the located node.

By the way the coordinate maps are constructed, it is not guaranteed that there are coordinate maps associated with a targeted node. To increase the probability that a source node can locate the candidates that are physically closest to it in a given zone, there are a number of techniques that may be used. For instance, a node's coordinates can be published not only in the designated grid, but also in a set of neighboring grids defined by a radius. This not only improves the availability of the coordinate maps, but also allows a summary of nodes living in the grids close-by to be built.

Alternatively, the coordinate maps may be stored onto a sub space of the "host zone". The net effect is a condensed map, which increases the chance of a node being able to locate the closest node in the expressway zone of interest. For example if the subspace is 0.5 of the size of the zone, the map stored on one node include information about approximately two nodes assuming a uniform distribution of the nodes in the Cartesian space. The ratio of map size to the size of the hosting zone may be the condense rate of the coordinate map. Clearly, the two mechanisms exhibit a trade-off: the replication and summary improve the possibility as well availability of the map service, but this is achieved at the expense of additional communication and storage costs; whereas the condensed map could possibly create hot spots for map queries. As another example, the two techniques can be combined to further increase the probability of locating physically close-by nodes.

If there no existing maps, the routing module 450 may be configured to program a time-to-live (TTL) packet to search the map area of the located node, in step 830'. Subsequently, the routing module 450 may return to the idle state of step 805'.

If there are existing maps, the routing module 450 may retrieve the maps from the located node, in step 835'. Subsequently, the routing module 450 may return to the idle state of step 805'.

Figure 9:
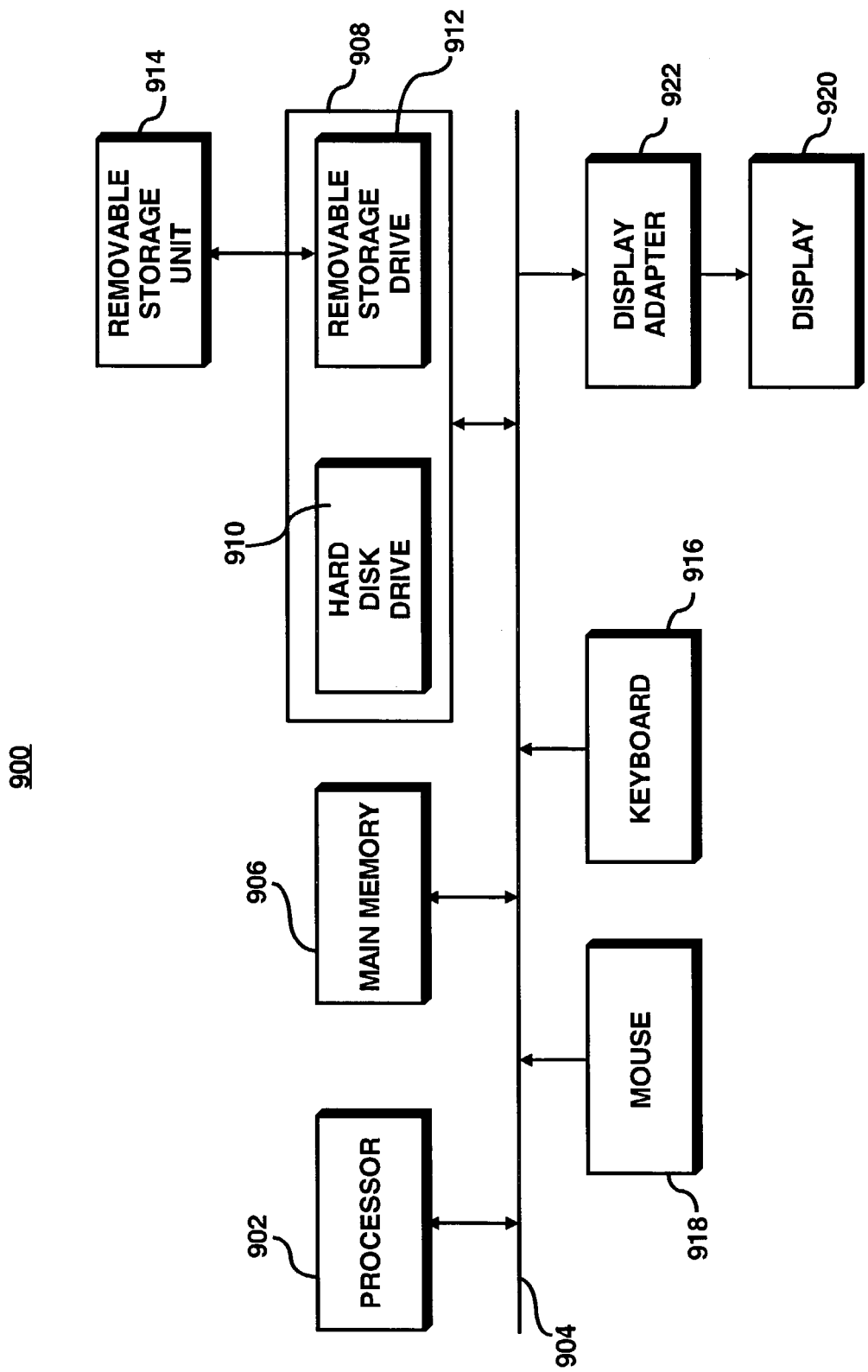
FIG. 9 illustrates a computer system where an embodiment may be practiced.

FIG. 9 illustrates an exemplary block diagram of a computer system 900 where an embodiment may be practiced. The functions of the expressway routing module may be implemented in program code and executed by the computer system 900. The expressway routing module may be implemented in computer languages such as PASCAL, C, C++, JAVA, etc.

As shown in FIG. 9, the computer system 900 includes one or more processors, such as processor 902, that provide an execution platform for embodiments of the expressway routing module. Commands and data from the processor 902 are communicated over a communication bus 904. The computer system 900 also includes a main memory 906, such as a Random Access Memory (RAM), where the software for the expressway routing module may be executed during runtime, and a secondary memory 908. The secondary memory 908 includes, for example, a hard disk drive 920 and/or a removable storage drive 922, representing a floppy diskette drive, a magnetic tape drive, a compact disk drive, etc., where a copy of a computer program embodiment for the expressway routing module may be stored. The removable storage drive 922 reads from and/or writes to a removable storage unit 924 in a well-known manner. A user interfaces with the expressway routing module with a keyboard 926, a mouse 928, and a display 920. The display adaptor 922 interfaces with the communication bus 904 and the display 920 and receives display data from the processor 902 and converts the display data into display commands for the display 920.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method of mapping peers in a peer-to-peer network to an overlay network; said method comprising:
   determining network coordinates for a selected peer;
   determining logical coordinates in said overlay network based on said network coordinates;
   determining a zone based on said logical coordinates; and
   storing an object comprising said network coordinates, a network address of said selected peer, and said zone in a peer owning said zone, whereby associated information is stored in said peer that has said network coordinates and using said network coordinates as a key.

2. The method according to claim 1, further comprising:
   storing a plurality of objects at said peer owning said zone; and
   forming a coordinate map based on said plurality of objects.

3. The method according to claim 2, further comprising:
   receiving said coordinate map from said peer owning said zone in response to a routing request from a candidate peer.

4. The method according to claim 3, further comprising:
   determining a closest peer in a neighboring zone based on said received coordinate map, said closest peer being physically closest to said candidate peer.

5. The method according to claim 1, wherein said determination of said plurality of network coordinates further comprises:
   determining a plurality of landmark vectors based on a set of landmark peers, each network coordinate based on a respective landmark vector.

6. The method according to claim 1, wherein said determination of said plurality of network coordinates further comprises:
   determining a plurality of landmark vectors based on a global positioning system, each network coordinate based on a respective landmark vector.

7. The method according to claim 5, further comprising:
   hashing said plurality of landmark vectors into logical coordinate space with a hash function configured to maintain physical relationships of said plurality of landmark vectors.

8. The method according to claim 1, further comprising:
   forming a plurality of coordinate maps, each coordinate map based on a respective group of network coordinates; and
   searching said plurality of coordinate maps with said network coordinate as a search index key.

9. The method according to claim 8, further comprising:
   retrieving a candidate coordinate map of said plurality of coordinate maps based on said network coordinates matching said candidate coordinate map.

10. The method according to claim 8, further comprising:
    forming a time-to-live packet in response to said network coordinates not matching said plurality of coordinate maps; and
    transmitting said time-to-live packet.

11. An apparatus for mapping peers in a peer-to-peer network to an overlay network, said apparatus comprising:
    means for determining a network coordinate of a peer;
    means for hashing said network coordinate into a target coordinate in the logical space of said overlay network; and
    means for determining a target zone based on said target coordinate.

12. The apparatus according to claim 11, further comprising:
    means for forming an object comprising of said target zone, said network coordinate, and an address for said peer; and
    means for storing said object in a owner peer that owns said target zone.

13. The apparatus according to claim 12, further comprising
    means for forming coordinate maps based on stored objects.

14. The apparatus according to claim 13, further comprising:
    means for searching said coordinate maps with candidate network coordinates; and
    means for retrieving matching coordinate maps based on said candidate network coordinates.

15. The apparatus according to claim 14, further comprising:
    means for selecting a candidate peer based on said retrieved coordinate maps.

16. A non-transitory computer readable storage medium on which is embedded one or more computer programs, said one or more computer programs implementing a method of mapping peers in a peer-to-peer network to an overlay network, said one or more computer programs comprising a set of instructions for:
    determining a network coordinate of a peer;
    hashing said network coordinate into a target coordinate in the logical space of said overlay network; and
    determining a target zone based on said target coordinate.

17. The computer readable storage medium in according to claim 16, said set of instructions further comprises:
    forming a triple comprising of said target zone, said network coordinate, and an address for said peer; and
    storing said triple in a owner peer that owns said target zone.

18. The computer readable storage medium in according to claim 17, said set of instructions further comprises:
    forming coordinate maps based on stored triples.

19. The computer readable storage medium in according to claim 18, said set of instructions further comprises:
    receiving a destination peer;
    hashing an address of said destination peer into a target key; and routing said target key to a target peer.

20. The computer readable storage medium in according to claim 19, said set of instructions further comprises:
    retrieving associated coordinate maps of said target peer.

21. The computer readable storage medium in according to claim 20, said set of instructions further comprises:
    selecting a candidate peer based on said retrieved coordinate maps.

22. A system for mapping peers in a peer-to-peer network to an overlay network, said system comprising:

a network; and a plurality of peers interconnected by said network and configured to implement said overlay network, wherein each peer is configured to store coordinate maps based on a hashing of a network position of a selected peer to a logical space of said overlay network.

23. The system according claim 22, further comprising:

a routing module stored and executed by each peer of said plurality of peers, wherein said routing module is configured to receive a destination peer, to hash an address of said destination peer to a target key and to route said target key to a target peer.

24. The system according to claim 23, wherein said routing module is further configured to retrieve associated coordinate maps of said target peer.

25. The system according to claim 24, wherein said routing module is further configured to select a candidate peer based on said retrieved coordinate maps.

* * * * *

UNITED STATES PATENT AND TRADEMARK OFFICE
CERTIFICATE OF CORRECTION

| | | |
|---|---|---|
| PATENT NO. | : 7,953,858 B2 | Page 1 of 1 |
| APPLICATION NO. | : 10/346067 | |
| DATED | : May 31, 2011 | |
| INVENTOR(S) | : Zhichen Xu et al. | |

It is certified that error appears in the above-identified patent and that said Letters Patent is hereby corrected as shown below:

In column 16, line 8, in Claim 11, delete "peer," and insert -- peer; --, therefor.

In column 16, lines 21-22, in Claim 13, delete "comprising" and insert -- comprising: --, therefor.

In column 17, line 7, in Claim 23, delete "according claim" and insert -- according to claim --, therefor.

Signed and Sealed this
Fourth Day of October, 2011

David J. Kappos
*Director of the United States Patent and Trademark Office*